(12) United States Patent
Victor et al.

(10) Patent No.: US 11,381,584 B1
(45) Date of Patent: Jul. 5, 2022

(54) SYSTEM AND METHODS USING EPHEMERAL ACCOUNTS TO LIMIT RISK OF EXPOSING SENSITIVE DATA

(71) Applicant: Amazon Technologies, Inc., Seattle, WA (US)

(72) Inventors: Anand Victor, Bellevue, WA (US); Ramnath R. Iyer, Seattle, WA (US); David Edouard Louis Robert, Issaquah, WA (US); Ankur Goenka, Redmond, WA (US); Zhengqiang Xu, Kenmore, WA (US); Keshav Aswathnarayana Narsipur, Redmond, WA (US); Kyle B. Peterson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

(21) Appl. No.: 16/562,347

(22) Filed: Sep. 5, 2019

(51) Int. Cl.
*H04L 9/40* (2022.01)
*G06F 9/455* (2018.01)

(52) U.S. Cl.
CPC ...... *H04L 63/1425* (2013.01); *G06F 9/45558* (2013.01); *G06F 2009/45562* (2013.01); *G06F 2009/45587* (2013.01)

(58) Field of Classification Search
CPC ............. H04L 63/1425; G06F 9/45558; G06F 2009/45562; G06F 2009/45587
See application file for complete search history.

(56) References Cited

U.S. PATENT DOCUMENTS

| | | | | |
|---|---|---|---|---|
| 9,519,513 | B2* | 12/2016 | Zada | G06F 11/3051 |
| 9,996,381 | B1* | 6/2018 | Raju | G06F 9/45558 |
| 10,095,532 | B2* | 10/2018 | Hiltgen | G06F 9/45545 |
| 10,289,468 | B1* | 5/2019 | Douglas | G06F 11/0712 |
| 2011/0197122 | A1* | 8/2011 | Chan | G06F 16/958 |
| | | | | 715/234 |
| 2013/0297805 | A1* | 11/2013 | Guo | H04L 29/08144 |
| | | | | 709/226 |
| 2014/0007189 | A1* | 1/2014 | Huynh | G06F 9/45558 |
| | | | | 718/1 |
| 2018/0173550 | A1* | 6/2018 | Court | G06F 11/3093 |
| 2018/0232517 | A1* | 8/2018 | Roth | G06F 21/50 |

\* cited by examiner

*Primary Examiner* — Matthew Smithers
(74) *Attorney, Agent, or Firm* — Davis Wright Tremaine LLP

(57) ABSTRACT

A customer in a computing resource service provider environment provisions a virtual machine instance configured with access to sensitive data in a secure storage facility. The virtual machine instance is provisioned specifically to generate reports using a subset of the sensitive data to satisfy different reporting requirements associated with governing entities and agencies. After generating the reports, the virtual machine instance is then removed from the computing resource service environment such that the sensitive data is inaccessible.

22 Claims, 11 Drawing Sheets

SYSTEM AND METHODS USING EPHEMERAL ACCOUNTS TO LIMIT RISK OF EXPOSING SENSITIVE DATA

CROSS-REFERENCE TO RELATED APPLICATION

This application incorporates by reference for all purposes the full disclosure of co-pending U.S. patent application Ser. No. 16/562,356, filed concurrently herewith, entitled "SYSTEM AND METHODS USING EPHEMERAL ACCOUNTS TO PROTECT USER ACCOUNTS WITH SENSITIVE DATA".

BACKGROUND

In modern computing systems and environments, security for systems and data is increasing in importance. In many computing environments, the transfer of data between computing systems raises security concerns. For example, an individual might use a computing system with access to sensitive data to generate reports that then include the sensitive data, which could then be transmitted to another computing system and intentionally or unintentionally circumvent data loss prevention systems. Accordingly, ensuring that other computing systems or unauthorized entities are unable to access the sensitive data is challenging and can involve a significant amount of time and manual labor.

BRIEF DESCRIPTION OF THE DRAWINGS

Various techniques will be described with reference to the drawings, in which.

DETAILED DESCRIPTION

Figure 1:
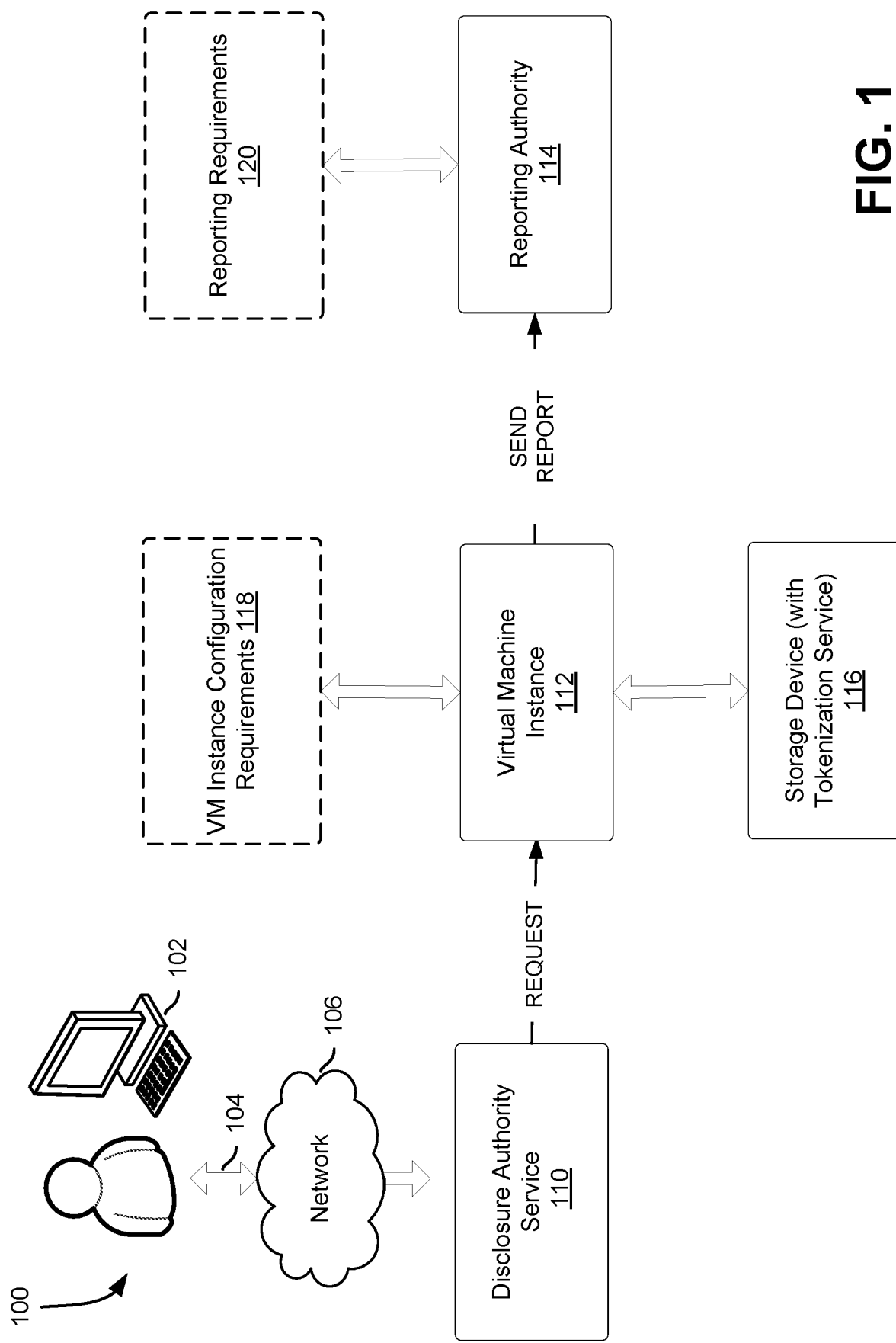
FIG. 1 illustrates an environment between a computing device and using a virtual machine (VM) instance to generate reports, in accordance with at least one embodiment.

Techniques described and suggested herein include methods, systems, and processes for generating a report with content that satisfies various reporting authority requirements while also limiting the exposure of sensitive data. That is, in an effort to satisfy reporting requirements for different reporting authorities, a virtual machine instance (referred herein as "VM instance") is instantiated with the necessary infrastructure, service, data, and connectivity to allow a customer in a computing resource service provider environment to access sensitive data and generate reports (e.g., suspicious activity reports) with the proper content and further send these reports off to the reporting authority to satisfy reporting requirements. After sending the reports, the VM instance is then deleted so that all the information including the sensitive data used by the VM instance become inaccessible. Thus, the VM instance is active for a limited amount of time that is proportional to the time that it takes to generate the reports (e.g., completion time to send the report). The VM instance, while active, has all the proper credentials to access a secure storage service in order to obtain all the sensitive data necessary to satisfy the reporting requirements. The VM instance may be limited to obtaining the sensitive data required for the report and no additional data, so that exposure is limited and sensitive data that is not pertinent to the report is not accessed unnecessarily.

More specifically, in an example, a request to generate a report for a particular reporting authority (e.g., government agency) is received by an application interface programming (API) gateway at a VM instance operating in a computing resource service provider environment. The request to generate the report can indicate information about the particular reporting authority for which the report is going to be generated. The workflow being performed can enable the VM instance to obtain access to the data needed to complete the report. The VM instance can use the information from the request to identify what data needs to be obtained, in what format the report (e.g., pipe-delimited text file) needs to be in, and other information pertinent to the reporting requirements set forth by the particular reporting authority. Subsequently, the VM instance can then generate the report and transmit it to the proper reporting authority. Once the report is transmitted, the VM instance is deleted such that services and other systems in the computing resource service provider environment are unable to access any of the information (e.g., data obtained by the VM instance) used to generate the report.

In an embodiment, instances are instantiated and associated with accounts associated with the customer. For example, in an embodiment, a VM instance is generated specifically to indicate account and transaction records associated with a customer and thus, limiting the exposure of data to the VM instance. The VM instance may then determine whether a suspicious activity has occurred in connection with the account with respect to the reporting authority's requirements. The VM instance may then generate the report with all the data (some in clear text form using a tokenization service) and suspicious activity information and send it to the proper reporting authority. The VM instance may subsequently be deleted such that information and data processed by the VM instance becomes inaccessible. In an embodiment, the VM instance can be instantiated along with a plurality of VM instances to monitor multiple accounts and transaction records simultaneously or near simultaneously, and each VM instance may be instantiated with the necessary infrastructure and services that are needed to satisfy individual reporting authorities.

Techniques described and suggested herein provide many technical advantages to the efficiency and security of transferring data in a technical environment. In some embodiments, transactions with a customer (e.g., business entity or corporation) may involve sensitive data such as bank account records and the customer may be required to generate a suspicious activity report about the transactions to satisfy various governing entities and their requirements for reporting transactions. These transactions, sensitive data, and any additional information about the transactions are typically stored in a physical secure storage facility owned and operated by the customer. Since the reports contain sensitive data, generating the reports require having access to the physical secure storage facility. Typically, one or more physical computing systems are inside a physical secure storage facility, and users are able to use the one or more computing systems inside the facility to obtain access to the sensitive data and generate reports from that data. However, physically having a user or authorized personnel go inside the storage facility just to upload reports can be labor intensive and inefficient.

The techniques described herein result in generating the reports using a virtual machine instance configured with the proper credentials to access the data from the secure storage facility and the virtual machine instance is configured to be active only for the duration in time relative to generating the report. The VM instance is used and provided with the proper credentials to access the sensitive data in the secure storage facility without having to physically send a user to be present in the secure storage facility. The VM instance then uses information to generate the report and formats the report according to the requirements of a reporting authority. The VM instance then is removed from the environment so that sensitive data that was used to generate the report is not exposed outside of the VM instance, which thereby reduces the risk of the sensitive data being exposed. Moreover, by using the VM instance, only data that is necessary for the report is used and then removed without exposing other sensitive data. That way, only the sensitive data necessary to generate the report is protected and thus, the system does not have to protect additional sensitive data unnecessary to the report, which limits the exposure of sensitive data.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a report is generated using a virtual (VM) instance 112. A user device 102 may connect to a disclosure authority service 110 via a connection 104 across a network 106. The user device 102 may be a remote VM instance running on one or more remote computer systems, or a software program that runs on the user device 102. The user device 102 can be implemented with a graphic user interface (GUI) that can obtain input from a user. The command or commands to connect to the host computer system (not depicted in FIG. 1) can originate from an outside computer system and/or server, or can originate from an entity, user or process on a remote network location, or can originate from an entity, user or process within the computer system, or can originate from the user device 102, or can originate as a result of a combination of these and/or other such entities.

The user device 102 can request connection to the host computer system via one or more connections 104 and, in some embodiments, via one or more networks 106 and/or entities associated therewith, such as servers connected to the network, either directly or indirectly. The user device 102 can request access to the host computer system, which also includes a disclosure authority service 110 can be another computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network 106 can include, for example, a local network, an internal network, a public network such as the Internet, a wide-area network, a wireless network, a mobile network, a satellite network, a distributed computing system with a plurality of network nodes, and/or the like. The network 106 can also operate in accordance with various protocols, such as those listed below, Bluetooth, Wi-Fi, cellular network protocols, satellite network protocols and/or others.

The user device 102 may send a request access to the disclosure authority service 110 within the environment 100 (the environment may be a distributed and/or virtualized datacenter) provided by a computing resource service provider. The computing resource provider can also provide access to one or more computer services such as additional virtual machine instances, automatic scaling groups, file-based database storage systems, block storage services, redundant data storage services, data archive services, data warehousing services, user access management services, content management services and/or other such computer system services as can be running thereon. The computing resource service provider can also provide access to computer system resources such as user resources, policy resources, network resources and/or storage resources. In some distributed and/or virtualized computer system environments, the resources associated with the computer services can be physical devices, virtual devices, combinations of physical and/or virtual devices or other such device embodiments. In some embodiments, the one or more host machines can be physical machines located within the computer system environment.

The user device 102 can request to generate a report (e.g., suspicious transaction record, or suspicious activity report) to satisfy one or more reporting requirements associated with a reporting authority 114. The reporting authority 114 may be, for example, an entity that helps identify potential fraudulent transactions. The disclosure authority service 110 (e.g., a service that is capable of receiving messages or requests from a user device 102) receives the request and sends an instruction, message, or another request to a VM instance 112 that is running on the host computer system also operating within the computing resource service provider. The VM instance 112 can be one of one or more VM instances running on the host computer system. The VM instance 112 may also be referred herein as simply an instance, virtual machine instance, or virtual instance.

When a VM instance 112 is identified that it can be used to generate the report, the VM instance 112 may use information from the request that originated from the user device 102, which includes all the details to construct the report to the reporting authority 114 (including subject, body, attachment file name, and attachment file content already in the format required by the reporting authority 114). In some embodiments, the report is sent as an email. In an embodiment, the VM instance 112 responds to the disclosure authority service 110 immediately with an Accepted response and creates a transmission workflow to transmit the report to the reporting authority 114. As part of the response, the VM instance 112 also includes a task identifier (e.g., task ID) for the disclosure authority service 110 so that the disclosure authority service 110 can use it in the future to query the transmission status. In embodiment, the VM instance's 114 workflow transforms the attachment file content by replacing the tokens with clear text of the sensitive data (e.g., data that is characterized by the user device 102 as sensitive), and creates the report to the reporting authority 114, in a particular format required by the reporting authority 114. The report may be signed with a private key (where the corresponding public key is shared with the reporting authority 114) and encrypted with a shared public key also shared between the VM instance 112 and the reporting authority 114. The encrypted report may then be sent in an email via a secure email service (SES) from the VM instance 112 to the reporting authority 114. In an embodiment, the VM instance 112 transmits the report to the reporting authority's 114 mail server with Simple Mail Transfer Protocol (SMTP) over Transport Layer Security (TLS). In an embodiment, the VM instance 112 then marks the transmission task as completed successfully. The disclosure authority service 110 may query the VM instance 112 with the previously obtained task ID, and the VM instance 112 may respond with a status of Completed.

Figure 2:
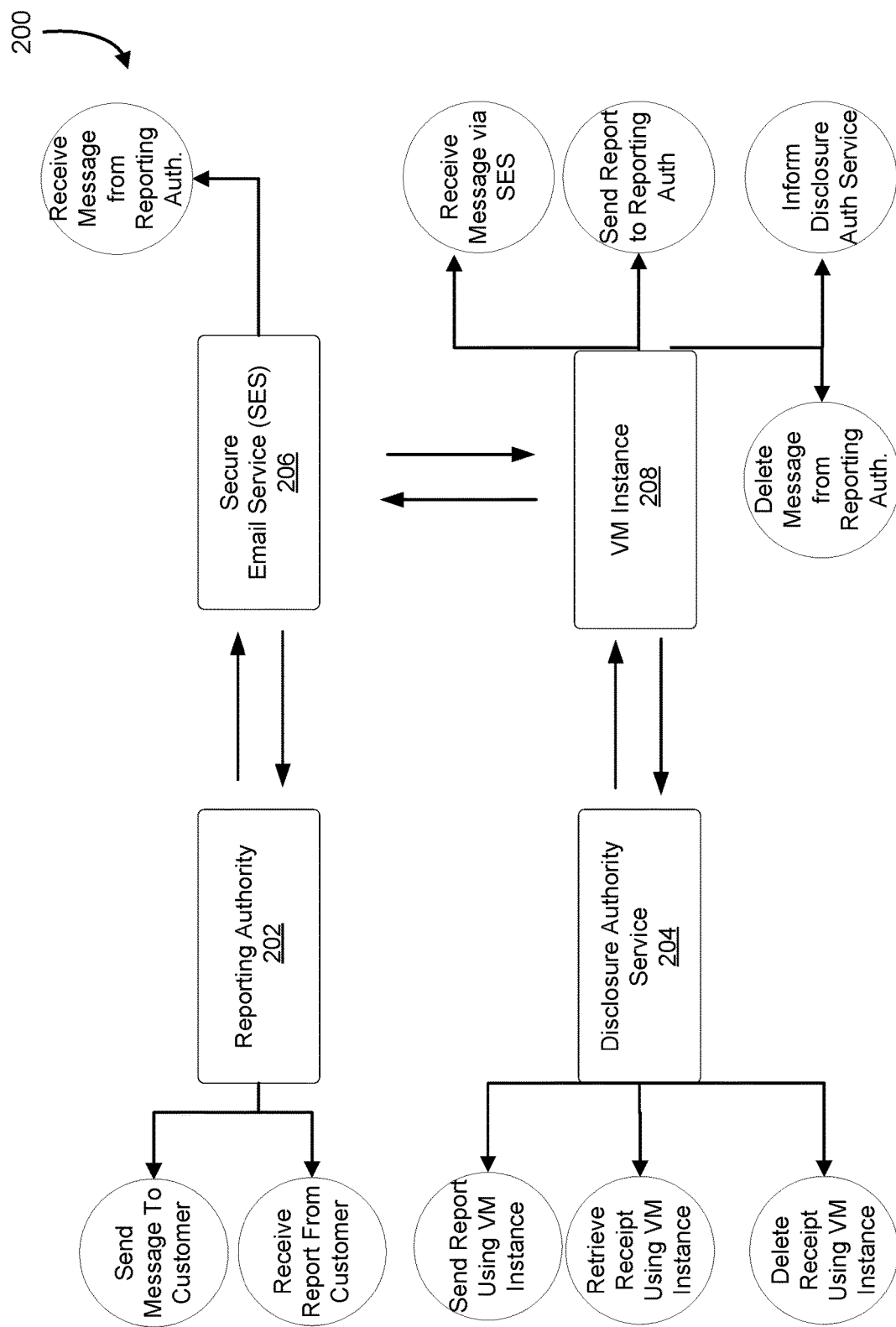
FIG. 2 illustrates a use case diagram indicating the capabilities of each of the services associated with a VM instance to generate reports, in accordance with at least one embodiment.

FIG. 2 illustrates a use case diagram 200 indicating the capabilities of each of the services associated with a VM instance 208 to generate reports, in accordance with at least one embodiment. In an embodiment, a reporting authority 202 is an entity that has the capability to send messages to a customer to indicate that the customer send reports (e.g., suspicious activity reports) back to the reporting authority 202. The messages may include the format of the reports, what content needs to be in the reports, and additional requirements that the customer may need to satisfy to generate the proper report. In an embodiment, the customer may be a business entity, company, corporation, and the like. The customer may operate a business where transactions are made and data associated with these transactions are recorded and stored within the customer's databases and/or storage devices. The customer may instruct a disclosure authority service 204 that is associated with a VM instance 208 to generate the proper reports for the reporting authority 202 after receiving a request from the reporting authority 202. In an embodiment, the disclosure authority service 204 has capabilities to send reports using the VM instance 208, retrieve receipts associated with successfully transmitting the reports using the VM instance 208, and/or delete the receipts. In an embodiment, the VM instance 208 uses a secure email service (SES) 206 to receive messages from the reporting authority 202, sending reports to the reporting authority 202, inform the disclosure authority service 204 about the status of sending the reports and/or delete messages obtained from the reporting authority 202. In an embodiment, the SES 206 is configured as a service that sends and receives messages such as emails from the reporting authority 202.

Figure 3:
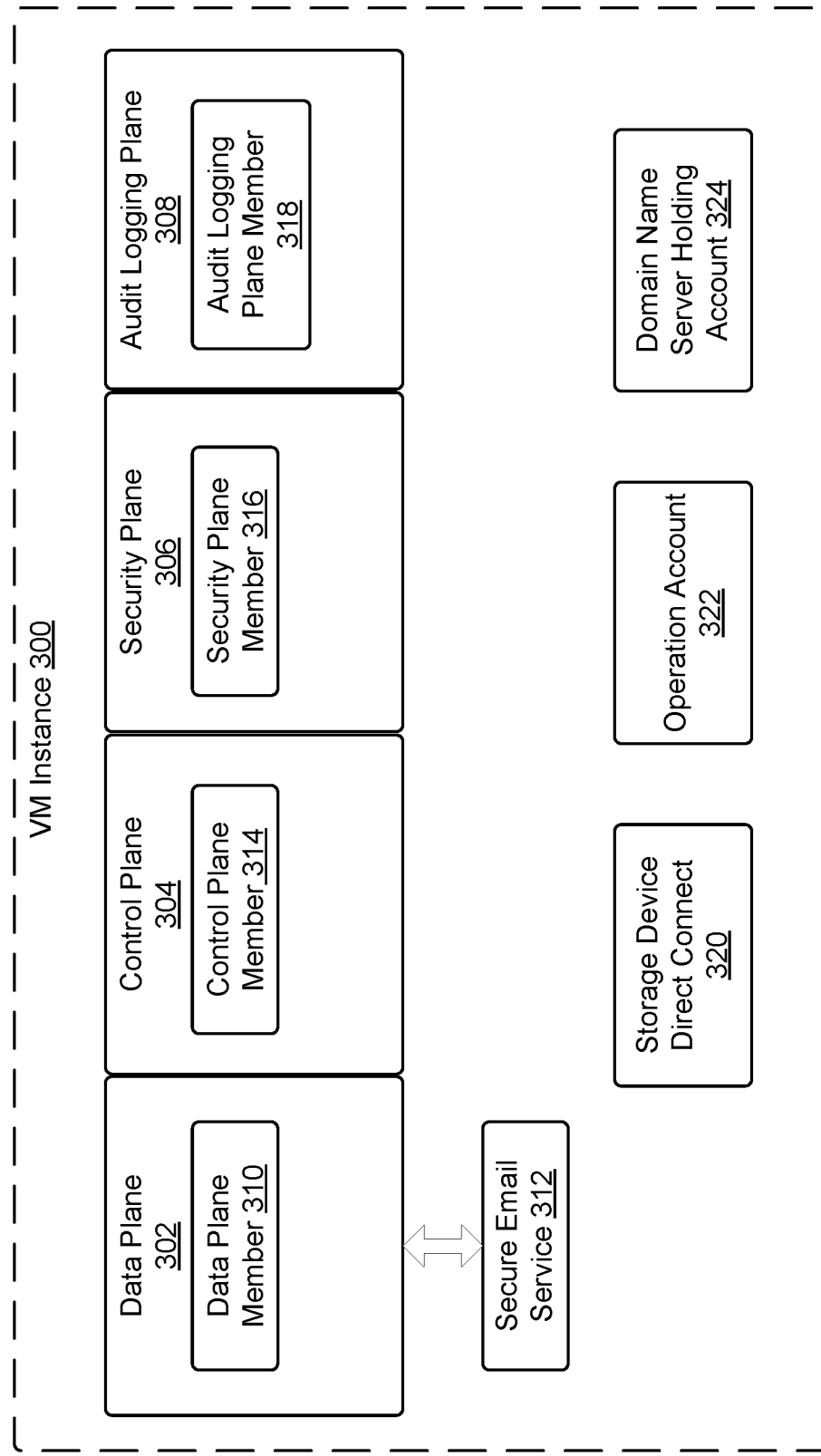
FIG. 3 illustrates various planes/services of a VM instance, in accordance with at least one embodiment.

FIG. 3 illustrates various planes/services of a VM instance 300, in accordance with at least one embodiment. In an embodiment, the customer can elect to obtain a VM instance 300 for the purposes of generating the report and deleting the VM instance 300 after the report is generated. Thus, the VM instance 300 may be limited to a one-time use. In an embodiment, the VM instance 300 is configured with infrastructure, service, data, and connectivity for the customer to have in order to all the necessities to generate the report for the customer to satisfy the reporting requirements. The reporting requirements can vary from reporting authority to reporting authority and thus, it may be beneficial that the VM instance 300 be configured with the proper infrastructure to perform the operations to satisfy the reporting requirements for various reporting authorities. In an embodiment, the VM instance 300 is referred to as an ephemeral infrastructure. To limit application vulnerability exposure and blast radius and to maintain good separation of responsibilities of owners, the VM instance 300 is segregated into multiple distinct services/accounts.

In an embodiment, the VM instance 300 includes a data plane 302, a control plane 304, a security plane 306, and an audit logging plane 308. The data plane 302, for instance, includes a data plane member 310 (e.g., data plane account) and a secure email service (SES) 312 that hosts the data processing service that implements API calls to securely transmit messages that may contain sensitive data (e.g., transactional data, payment critical data). In an embodiment, the data plane member 310 is configured for hosting the services that implement the API. Within the data plane 302 illustrated in FIG. 3, the VM instance 300 is further divided into five microservices with distinct roles and responsibility (which is described in more detail with respect to FIG. 4 below). In an embodiment, the control plane 304 includes a control plane member 314. In an embodiment, the security plane 306 includes a security plane member 316. The security plane member 316 may be configured to host detective controls over data plane accounts. In some instances, the security plane 306 may referred to as the monitoring plane (which is described in more detail with respect to FIG. 8 below). In an embodiment, the VM instance 300 also includes an audit logging plane 308 with an audit logging plane member 318. The audit logging plane 308 may be configured to log the events of the VM instance 300 such as information related to report generation and the contents of the report. That is, the audit logging plane member 318 may be configured for archiving application, operating system (OS), and account logs for auditing purposes. Moreover, compliance offices may have internal or external compliance officers will audit the VM instance 300 to ensure that it meets all applicable handling standards, and the standard for building system that meet the requirements for processing sensitive data (e.g., restricted, critical, and/or payment critical data) as specified by the a data protection model.

In an embodiment, the VM instance 300 has a connection with the storage device via a direct connect. The storage device as described herein may be a database or the like that stores records of the sensitive data. For example, each business entity may have a storage device that is a database containing records where all financial transactions that the business entity has processed are logged and stored. In an embodiment, the storage device 320 may also be referred to as a payment secure zone or a secure storage device. The VM instance 300 may have the appropriate credentials and have the necessary infrastructure to obtain sensitive data for reporting purposes. In an embodiment, the VM instance 300 also has an operation account associated with it. The operation account 322 may be configured for hosting the logs for viewing and analysis, and operation tools, including metrics, alarms, and dashboards. In an embodiment, the domain name server (DNS) holding account 324 is also associated with the VM instance 300 and configured for managing domain names.

In an embodiment, the data plane member 310 may be created anew every time when a transmission is needed, and then deleted once the transmission completes. All the credentials, keys, certificates, and resources used in this data plane member account are created every time a new account is created, with the exception of the public-private key pairs used to sign and encrypt the reports, which are stored using a storage service associated with the data plane 302.

Figure 4:
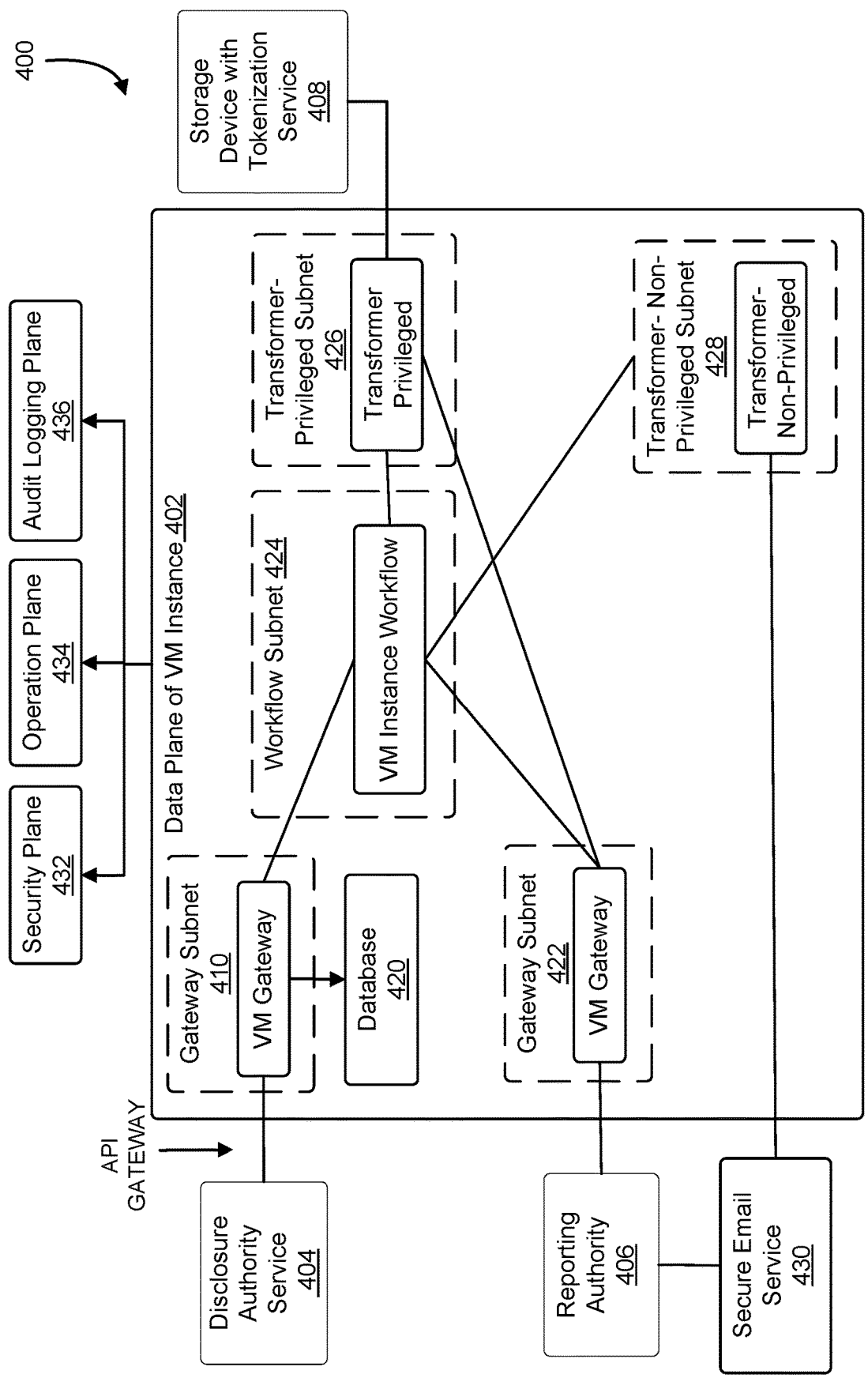
FIG. 4 illustrates a diagram of the connections between the various components used with a VM instance to generate the reports, in accordance with at least one embodiment.

FIG. 4 illustrates a diagram 400 of the connections between the various components used with a VM instance to generate the reports, in accordance with at least one embodiment. The data plane of the VM instance 402 and its connections are described in more detail here with respect to FIG. 4. The data plane of the VM instance 402 may be configured to implement the APIs for transmitting and receiving messages.

In an embodiment, the data plane of the VM instance 402 comprises at least a plurality of micro services, which may include: 1) a gateway subnet 410, which is a micro service that accepts API calls forwarded from an API gateway of a disclosure authority service 404 that is a part of the computing resource service provider and calls the workflow service in the workflow subnet 424 that implements the API. In an embodiment, the gateway subnet 410 is associated with a database 420 that has access to obtain data and/or sensitive data used to generate reports; 2) a workflow subnet 424 associated with a VM instance workflow is a micro service that implements the workflow logic of the APIs; 3) a transformer-privileged subnet 426 that prepares the data for transmission. This micro service has access to APIs associated with a tokenization service to convert tokens to clear text critical data. This is only called by the workflow subnet 424 micro service to limit its exposure to threats; 4) a transformer-non-privileged subnet 428 that deals with use cases where no access to the tokenization service is required. In some use cases, the incoming email messages from reporting authority 406 go through the transformer-non-privileged subnet 428 to be decrypted and verified; 5) another gateway subset 422, which is a micro service that transmits data prepared by the transformer-privileged subset 426 to specified endpoints. In an embodiment, the data plane of VM instance 402 may also communicate with the security plane 432, operation plane, and the audit logging plane 436 as described with respect to FIG. 3. In an embodiment, communication between API gateway and the data plane of VM instance 402 along with communication among data plane micro services may use TLS mutual authentication.

Figure 5:
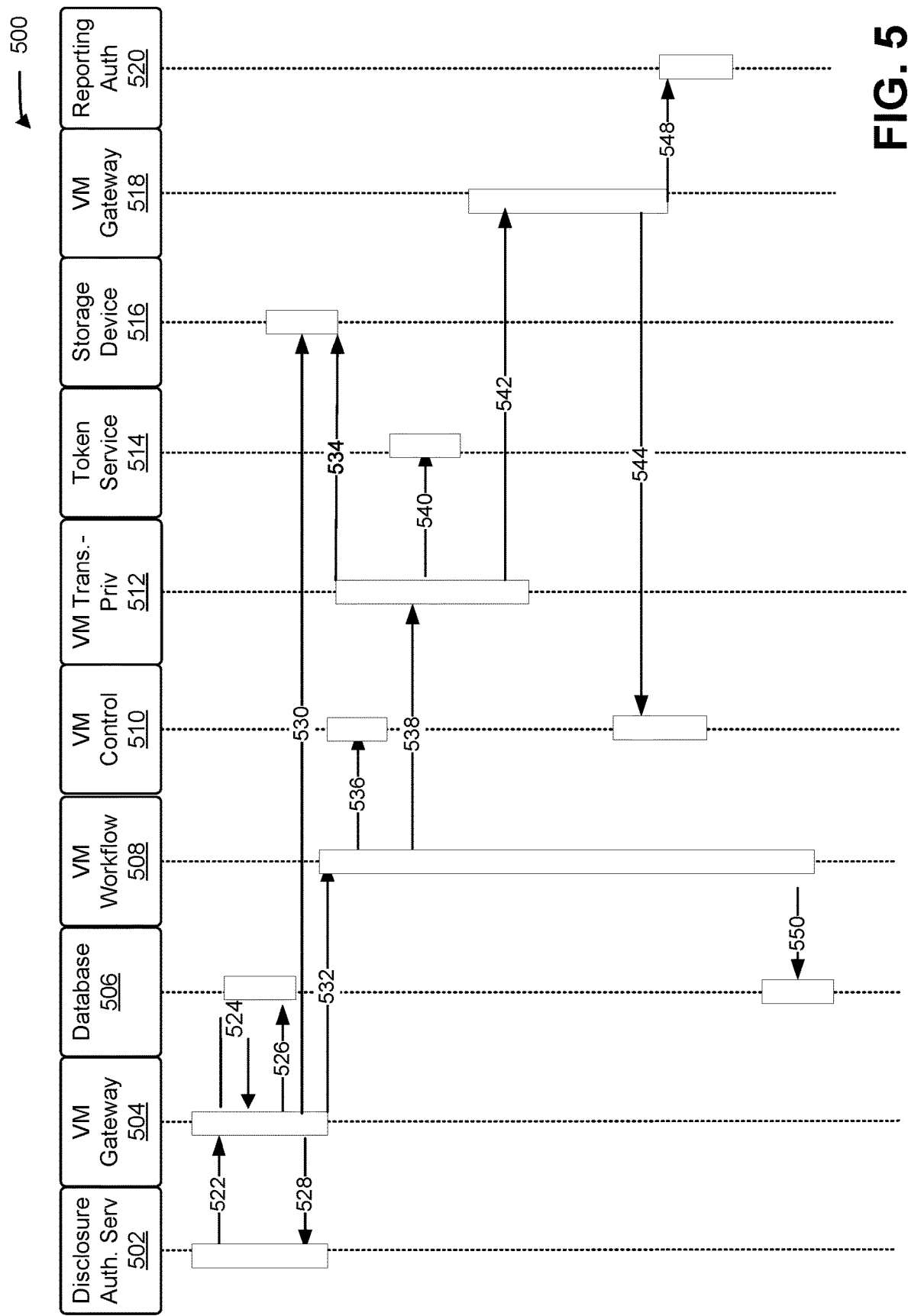
FIG. 5 illustrates a process for sending a report to a reporting authority, in accordance with at least one embodiment.

FIG. 5 illustrates a process 500 for sending a report to a reporting authority, in accordance with at least one embodiment. In an embodiment, a disclosure authority service 502 sends 522 a message to a VM instance via a VM gateway 504. The message may specify all the details of constructing the report to the reporting authority 520 including subject, body, attachment file name, and attachment file content already in the format (e.g., pipe-delimited text containing tokens) as required by the reporting authority 520. The message may be transmitted with tokens. The VM gateway 504 verifies that the message is legitimate 524 and responds 528 to the disclosure authority service 502 with an Accepted response 528 and creates a task 526 for a transmission workflow to transmit a report to reporting authority 520. The VM gateway 504 transmits the task 532 to VM workflow 508. The obtained tokens are then sent 530 to a storage device 516 that is associated with a tokenization service. The VM workflow 508 sends a message 536 to VM control 510. The VM workflow 508 may send a transform request 538 to the VM transformation-privileged service 512. The VM transformation-privileged service 512 sends a request 540 to the tokenization service 514 to get the tokens replaced for clear text form data. The access to data may be time-based. That is, there may be access control policies associated with the data that indicate the amount of time that data can be obtained using the tokens. In some instances, data can be obtained using tokens so long as the VM instance is still executing (e.g., within the lifespan of the VM instance). The clear text form data may be encrypted using the VM instance's key such that the clear text form data is not exposed while being transported from the tokenization service 514 to the VM instance. The VM transformation-privileged service 512 sends the generated report 542 with sensitive data (some in clear text form) to the VM gateway 518. In some instances, the entirety of generated report may be encrypted to meet the requirements of the reporting authority 520. In other instances, just the sensitive data is encrypted in the generated report. The VM gateway 518 may then send a GET request 544 for end point configuration. The VM gateway 518 may then send the report 548 in email form to the reporting authority 520. The VM workflow 508 may update 550 the task status as completed and inform the database 506.

In an embodiment, the VM instance's workflow 508 transforms the message (e.g., attachment file content) from the disclosure authority service 502 by replacing the tokens with clear text data, and creates the report to the reporting authority in Secure/Multipurpose Internet Mail Extensions (S/MIME) format, signed with private key of the system and encrypted with public key of the reporting authority. The VM instance transmits the report in email form to reporting authority's mail server with SMTP over TLS. The VM workflow 508 mark the transmission task as completed 550 successfully and the disclosure authority service 502 may query the VM instance with task identifier (e.g., task query request) and responds with a message, notification, or status of Completed.

In another embodiment, the reporting authority 520 can send messages to the customer via a disclosure authority service 502. This may be performed by sending an email to an address associated with a customer or an entity. This email may be subsequently received by the customer's secure email service (SES). The email may be signed with the reporting authority's key and encrypted with a key shared with the customer. In an embodiment, the disclosure authority service 502 calls using an API to the VM instance to check available messages on the preconfigured end-point. The VM instance checks configured storage areas that the SES deposit incoming emails addressed to the customer. The VM instance returns the list of available messages, each with an identifier to the disclosure authority service 502. The disclosure authority service 502 receives the list of messages. The disclosure authority service 502 submits an API call to the VM instance with a message identifier to fetch the content of the message. This part of can repeat for all the messages that disclosure authority service 502 wants to retrieve. The VM instance retrieves the message from the storage area that SES has for the customer's email address. The VM instance may decrypt the message with its key and verify the reporting authority's signature with the shared key with the reporting authority 520. The VM instance may verify that the message does not contain payment critical data and returns the message with the reporting authority's signature to the disclosure authority service 502.

In yet another embodiment, the disclosure authority service 502 finds that all messages have been read before and there is no need to retrieve any of the messages in the list and thereby may end its search. In an embodiment, the VM instance fails to retrieve the message and returns a failed status to the disclosure authority service 502 and the process may then terminate at this point. In an embodiment, the VM instance fails to decrypt the email, or fails to verify reporting authority's 520 signature and returns a failed status to the disclosure authority service 502 and then at this point may also terminate. In yet another embodiment, the VM instance may detect a presence of payment critical data in the message and return a failed status to the disclosure authority service 502. The VM instance may send an alarm for this security incident, start the security incident response process, and then terminate.

Figure 6:
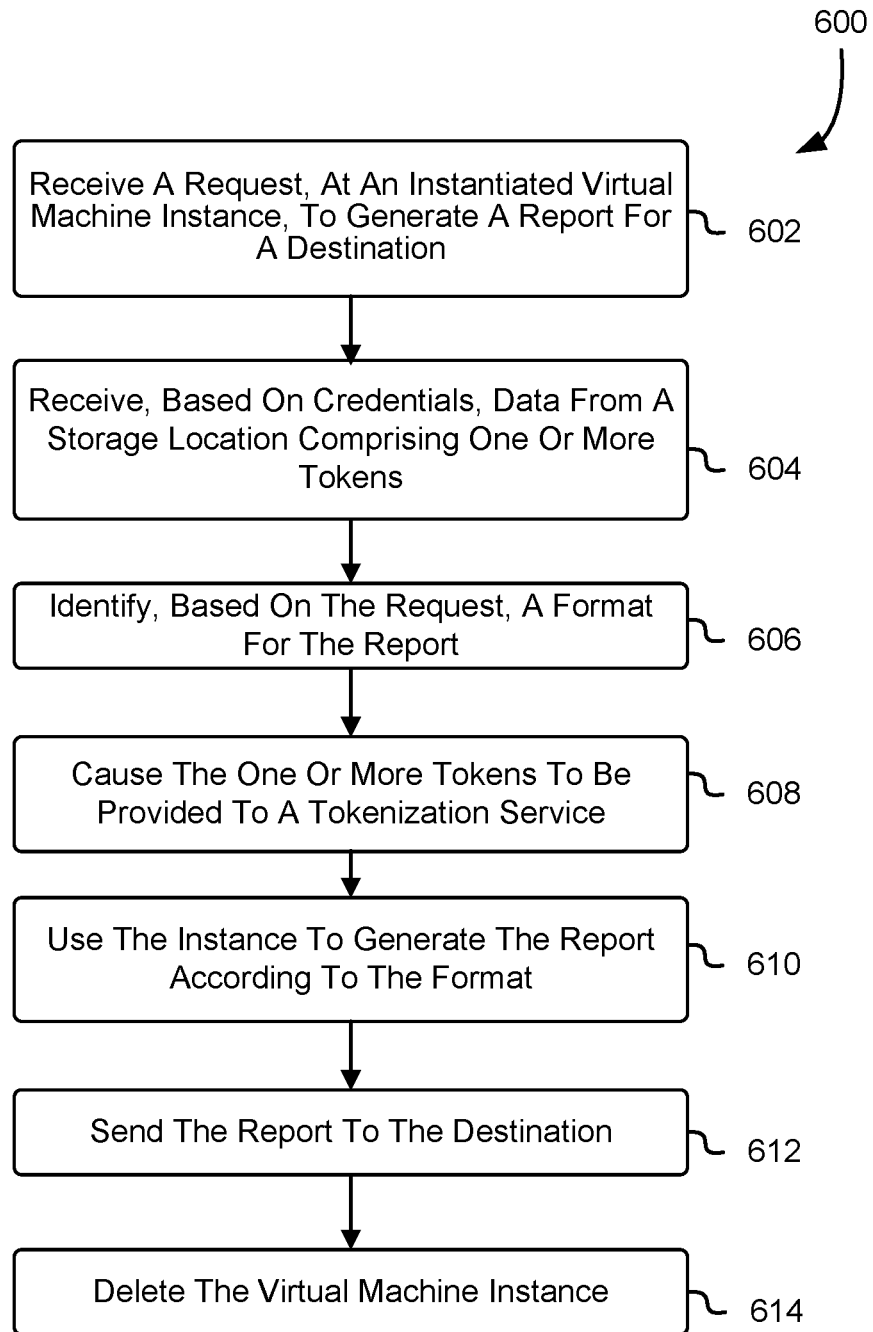
FIG. 6 illustrates an example process for using a VM instance to generate a report and further sending the report to the reporting authority, in accordance with at least one embodiment.

FIG. 6 illustrates an example process 600 for using a VM instance to generate a report and further send the report to the reporting authority, in accordance with at least one embodiment. In an embodiment, process 600 describes satisfying reporting requirements for a reporting authority using a virtual computing environment. A customer (e.g., user, business owner, business entity) in a computing resource service provider environment may have to report transaction records, deals, financial irregularities, and the like to a reporting authority. Each reporting authority may have its own reporting requirements that the customer must follow. In an embodiment, a customer, via a disclosure authority service associated with the customer may receive a request from the reporting authority. In an alternate embodiment, the request may initiate from the customer and not the reporting authority. The request may cause the disclosure authority service to associate with a virtual machine (VM) instance from a plurality of VM instances. The VM instance may receive the request from the disclosure authority service to generate a report for a destination (e.g., an entity external to the system) 602. The VM instance may be tailored with the necessary infrastructure, services, and/or configurations to satisfy the request. In an example, the request may indicate information to satisfy the reporting requirements fully, such as the type of format the report must follow, the content of the report, and the like. The VM instance is then configured with the necessary infrastructure to satisfy the reporting requirements. In an alternate embodiment, the disclosure authority service sends a request to instantiate a new VM instance to perform the process 600 instead of associating with a previously instantiated VM instance.

In an embodiment, the VM instance, based on its configurations with the proper credentials, receives data comprising one or more tokens from a database (e.g., storage device) 604. The data may be sensitive data that includes sensitive information associated with a plurality of individuals or companies. The data obtained may only be data that is necessary to satisfy the reporting requirements and nothing more from the database so that exposure is limited. In an embodiment, the VM instance may identify, based on the request, a format for the report 606. In an embodiment, information to fully satisfy the reporting requirements may indicate that the type of content in the report must include all the account numbers that have been made a transaction on the customer's online store in the past year. Hence, the data obtained from the database would just be a subset of the data that include the account numbers, and no other data. This way, exposure of sensitive data is limited and other types of sensitive data are not exposed for processing when not needed. In addition, by only obtaining a subset of the data, computing resources may be conserved since the VM instance is performing operations using just a subset of the data and not all the data from the database, for example. In some embodiments, the subset of data obtained from the database include one or more tokens. The VM instance may then forward the one or more tokens to a tokenization service to obtain the data in clear text form 608. The tokenization service may include mapping information such that it identifies the location of data in clear text form based on information from the one or more tokens.

In an embodiment, the report is then generated by the VM instance 610 with the obtained data along with some of the data in clear text form. The report may be sent over email from the VM instance's secure email service to the reporting authority and thus, satisfying the reporting requirements of the reporting authority 612. The report may be encrypted prior to submission. The VM instance 610 may then be removed or deleted 614 from the computing resource service provider environment such that any data that was obtained during process 600 is inaccessible outside of the environment. In an embodiment, data obtained during process 600 become inaccessible when encryption keys associated with the data are deleted. That is, encryption keys used to encrypt data may be deleted as a way of deleting or causing the data obtained during process 600 to be inaccessible. In an embodiment, the VM instance 610 and all of its data are deleted when an unexpected event occurs and not necessarily deleted only after submission of a report as indicated above. In some instances, there may be an anomaly detection mechanism or a set of conditions directed to monitoring the VM instance for anomalies. If an anomaly is detected, the VM instance may be terminated instantly.

Figure 7:
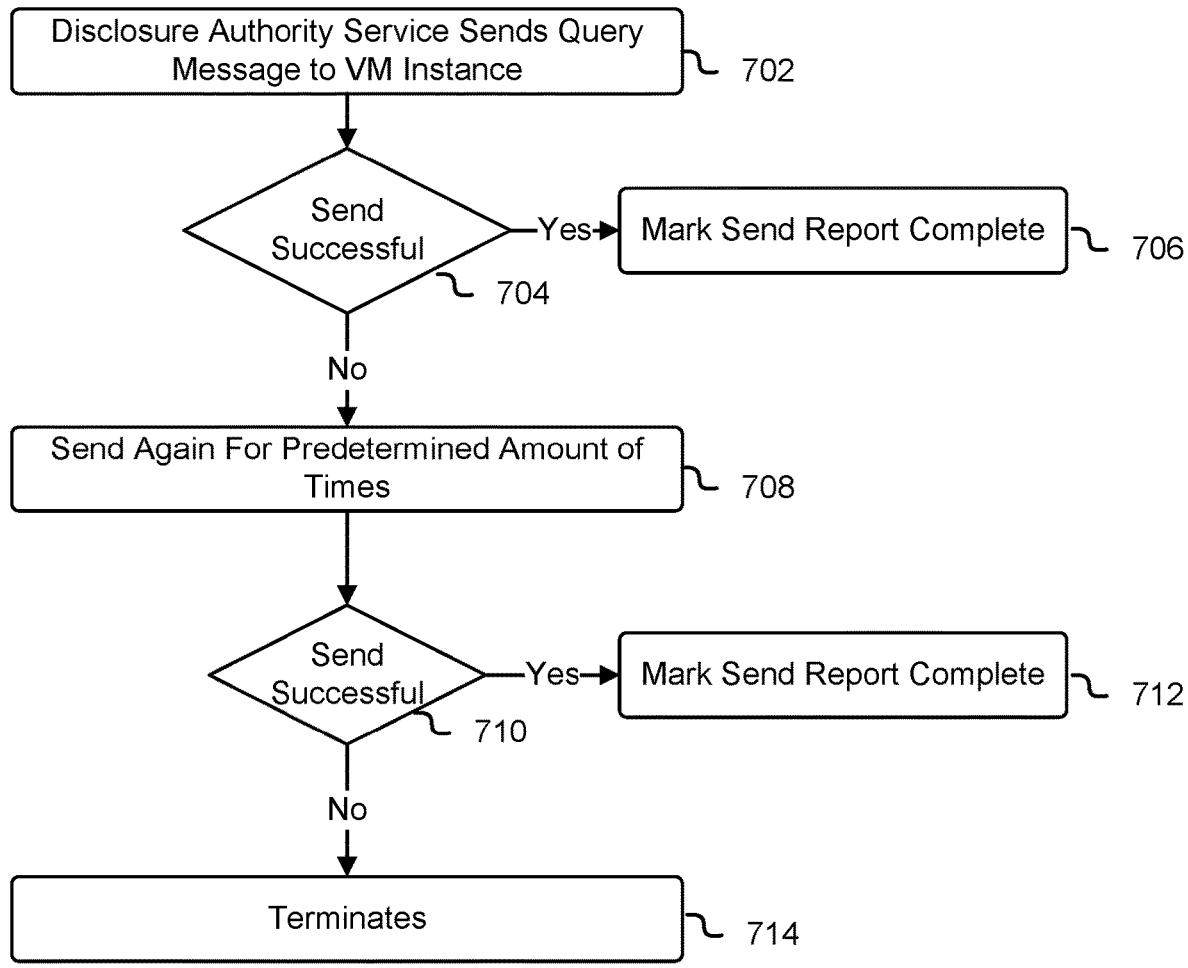
FIG. 7 illustrates an example process in which a VM instance is used for each report until the report is successfully transmitted to the reporting authority, in accordance with at least one embodiment.

FIG. 7 illustrates an example process 700 in which a VM instance is used for each report until the report is successfully transmitted to the reporting authority, in accordance with at least one embodiment. In an embodiment, the disclosure authority service queries the VM instance with a message with a task identifier before VM instance completes the transmission. At 704, a determine is made whether the VM instance fails to transform the attachment file content due to erroneous content, non-existing tokens, tokenization service failures, or other failures. If a send was successful, the task is marked as complete and the report is sent to the reporting authority 706. If the send is not successful, the VM instance records the task status as Failed Transformation. In an embodiment, disclosure authority service queries the VM instance with task identifier and VM instance responds with a status of Failed Transformation and the operations may terminate. In an embodiment, the report fails to transmit the reporting authority's mail server. The VM instance may retry for the preconfigured or predetermined maximum retries 708 from the end-point configuration and succeeds. The VM instance marks the transmission task as completed successfully and task is completed 712. The VM instance retries for the preconfigured maximum retries from the end-point configuration and fails then the VM instance records the task status as Failed Transmission and it terminates 714. In an embodiment, a new VM instance is used and active for an amount of time proportional to the time the report is generated and sent off to the reporting authority.

Figure 8:
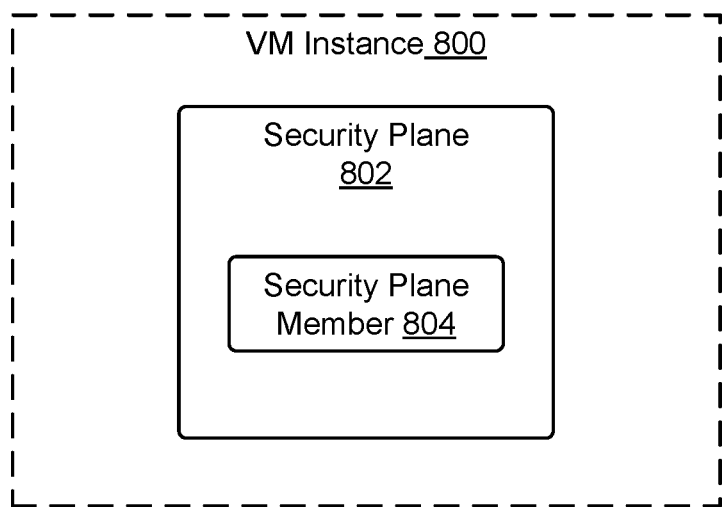
FIG. 8 illustrates an example diagram of a security plane associated with the VM instance, in accordance with at least one embodiment.

FIG. 8 illustrates an example diagram of the security plane 802 associated with the VM instance 800, in accordance with at least one embodiment. The security plane (e.g., security detection plane) 802 comprises a security plane member (e.g., security plane account member) 804 and comprises detective controls based on log streams from other planes. The audit logging plane (not depicted here in FIG. 8 but depicted in other FIGS. in the detailed description) saves copies of pristine and immutable logs from other planes for auditing and forensics purposes. In an embodiment, the ownership of security plane 802 includes owing 1) the code for the detective controls, which include both the code and the infrastructure that the code runs on; 2) Continuous Integration/Continuous Deployment (CI/CD) pipelines for building, testing and deploying the controls; 3) incident response processes and tools to handle alarms filed by the controls; 4) monitors and dashboards for the health of the controls, including in-prod testing of the controls; 5) security operation reviews with weekly cadence and with operation report decks.

In an embodiment, owning the code for the detective controls entails owning the control code packages independent of the VM instance. In the an exemplary stack, the code for the detective controls may be code in an event-driven and sever less computing system associated with the VM instance application package and the cloud formation templates in the VM instance software tools package. The code may need to be broken out into new packages owned by a payment security team.

In an embodiment, owning the CI/CD pipelines entails owning the build, testing, and deployment pipeline that deploys the control code to the security detection plane. The application of the VM instance constructs a custom pipeline due to security constraints. A payment security team can and should evaluate the security requirements of the detective controls and make independent technology decisions.

In an embodiment, owning the incident response processes and tools entails owning the tools to handle alarms (tickets) filed by the controls. In an embodiment, owning the monitors of the health of the controls entails having proper metrics and alarms for the health of the controls. The security requirements of no console access and no host access means that logs and metrics of the security detection plane accounts may be channeled to a security operation account (different from the VM instance operation account) for log view, dashboards, and alarms. In an embodiment, automated and/or regular manual in-prod testing should be conducted to ensure that the controls work over time, even if there is a lack of real triggering events. In an embodiment, owning the security operation reviews entails the establishment of a regular (weekly) cadence of security operation review. This review will be supported by an operation deck that includes aggregate of present and historical metrics generated by the detective controls, the monitors of the detective controls, and the artifacts generated by the operations (alarms, tickets, etc.).

Figure 9:
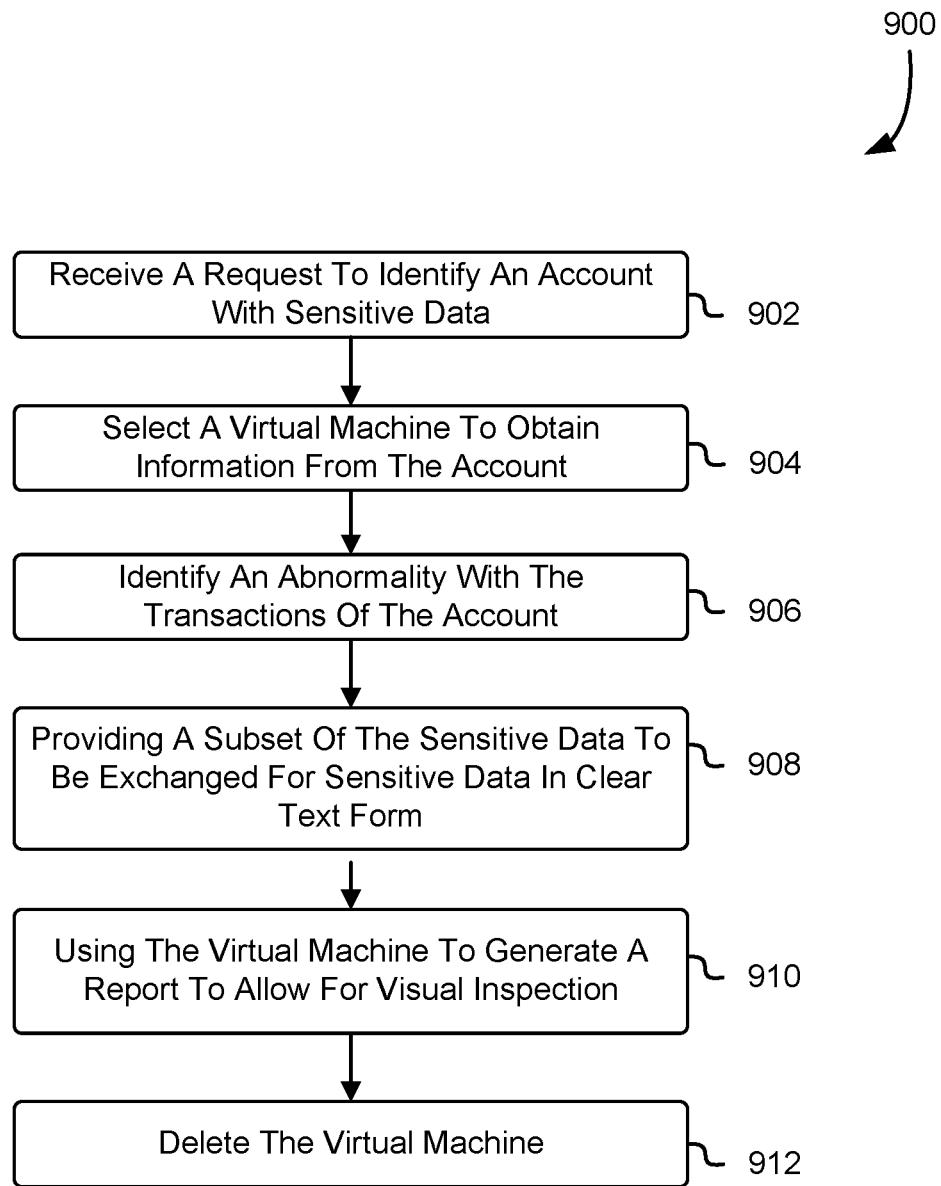
FIG. 9 illustrates an example process in which a plurality of VM instances are instantiated to generate a report, in accordance with at least one embodiment.

FIG. 9 illustrates an example process in which a plurality of VM instances are instantiated and used to identify activities to generate a report, in accordance with at least one embodiment. In an embodiment, a disclosure authority service associated with a customer in a computing resource service provider environment may obtain a request to satisfy reporting requirements for a reporting authority. In an embodiment, the disclosure authority service may forward the request to a VM instance may receive a request to monitor one or more accounts comprising sensitive data, wherein the one or more accounts are associated with a customer of a computing resource service provider 902. In an embodiment, the VM instance may select another VM instance from a plurality of VM instances to monitor the one or more accounts 904. This selected VM instance is selected and configured with the necessary infrastructure and services to monitor the one or more accounts that satisfy the reporting requirements for a particular reporting authority. In an embodiment, this selected VM instance may monitor and identify an abnormality (e.g., suspicious activity) with transactions associated with the one or more accounts 906. In an embodiment, the suspicious activity may include a non-limiting example of identifying that one or more fraudulent purchases are being made on the customer's accounts. In an embodiment, this selected VM instance may detect that the transaction records associated with the suspicious activity include sensitive data and a subset of the sensitive data comprises tokens. This selected VM instance may then provide the subset of the sensitive data, based on identifying the abnormality, to a service (e.g., tokenization service) in exchange for the subset of the sensitive data in clear text form 908. In an embodiment, this selected VM instance generate a report (e.g., suspicious activity report) to allow for visual inspection of what is captured in the report, wherein the report includes information indicating the abnormality with the transactions, the sensitive data, and the subset of sensitive data in clear text form 910. That is, in an embodiment, a generated report with suspicious activity is queried (e.g., inspected). A user or an entity may query the report to detect suspicious activity or transactions associated with a destination (e.g., user account, merchant's website). In an embodiment, this VM instance is then deleted in response to completing the visual inspection 912 such that any data or information processed by this VM instance is not exposed.

Figure 10:
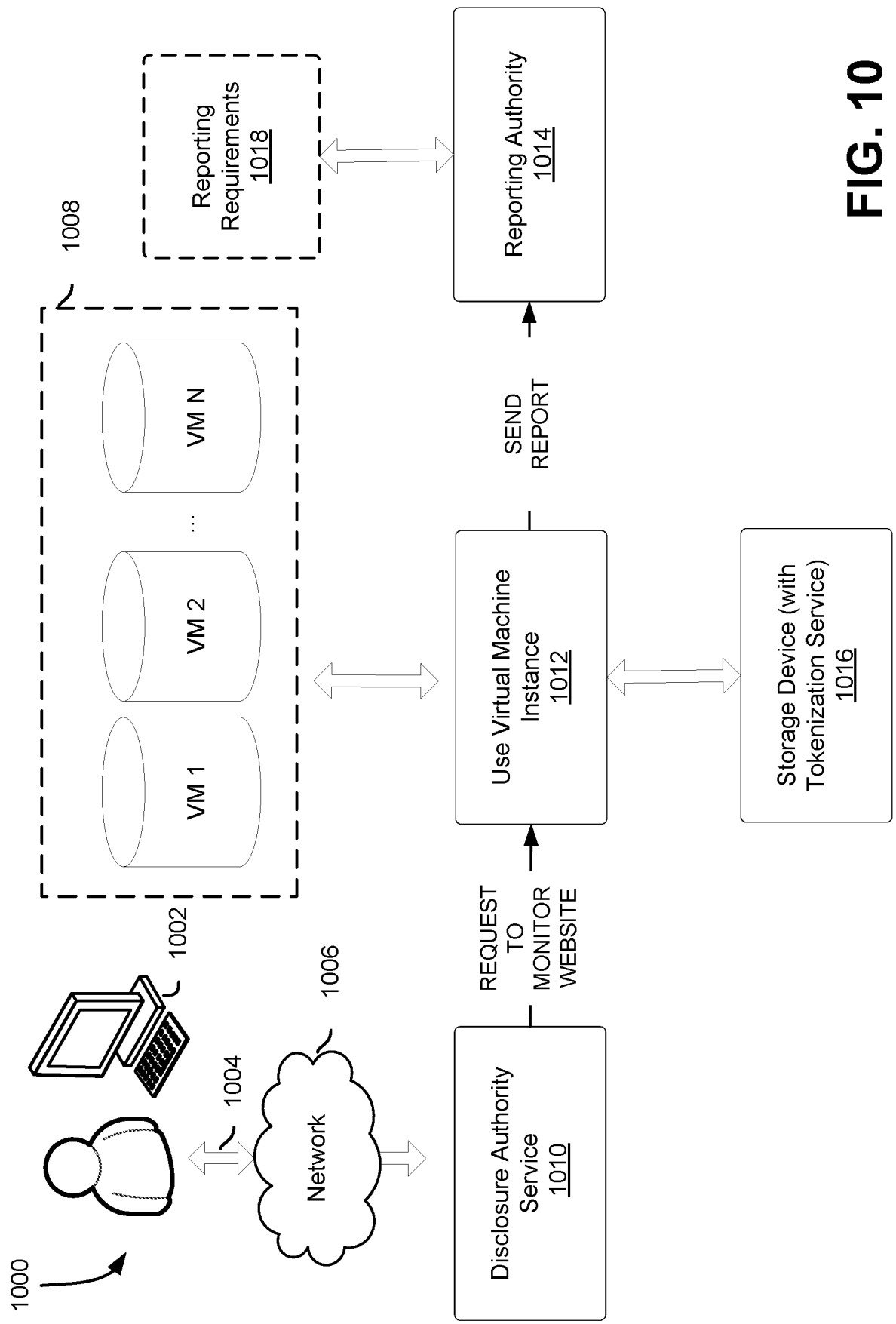
FIG. 10 illustrates an environment in which a VM instance is selected from a plurality of VM instances to generate reports, in accordance with at least one embodiment.

FIG. 10 illustrates an environment 1000 in which a VM instance 1012 is selected from a plurality of VM instances 1008 to monitor transactions associated with a customer's account to generate reports, in accordance with at least one embodiment. In an embodiment, a user device 1002 (controlled by a customer) sends a request 1004 to monitor one or more accounts associated with the customer via a network 1006. The request may be received by a disclosure authority service 1010, which then may forward the request to cause VM instance 1012 to be selected. That is, in an embodiment, a VM instance 1012 may be selected to specifically monitor account and transaction records associated with a customer and thus, limiting the exposure of the VM instance 1012 to just the data associated with the monitoring. The VM instance may be selected from a plurality of VM instances 1008. The VM instance 1012 may then determine whether a suspicious activity has occurred with respect to the reporting authority's requirements. The VM instance 1012 may then generate the report with all the data (some in clear text form using a tokenization service associated with a storage device 1016) and suspicious activity information and send to the proper reporting authority 1014. The VM instance 1012 may be subsequently be deleted such that information and data processed by the VM instance 1012 becomes inaccessible. In an embodiment, the VM instance 1012 can be instantiated along with a plurality of VM instances 1008 to monitor multiple accounts and transaction records simultaneously or near simultaneously, and each VM instance may be instantiated with the necessary infrastructure and services that are needed to satisfy reporting requirements 1018 for each individual reporting authorities. In an embodiment, a second virtual machine instance may be instantiated to monitor a subset of the transaction records for the account associated with the customer to generate a second report while the first virtual machine instance monitors the account. For example, based on monitoring the account using the first VM instance, a certain bank account number is fraudulent, so the second VM instance is just spun up to monitor any transactions regarding the bank account and generate reports for that.

Figure 11:
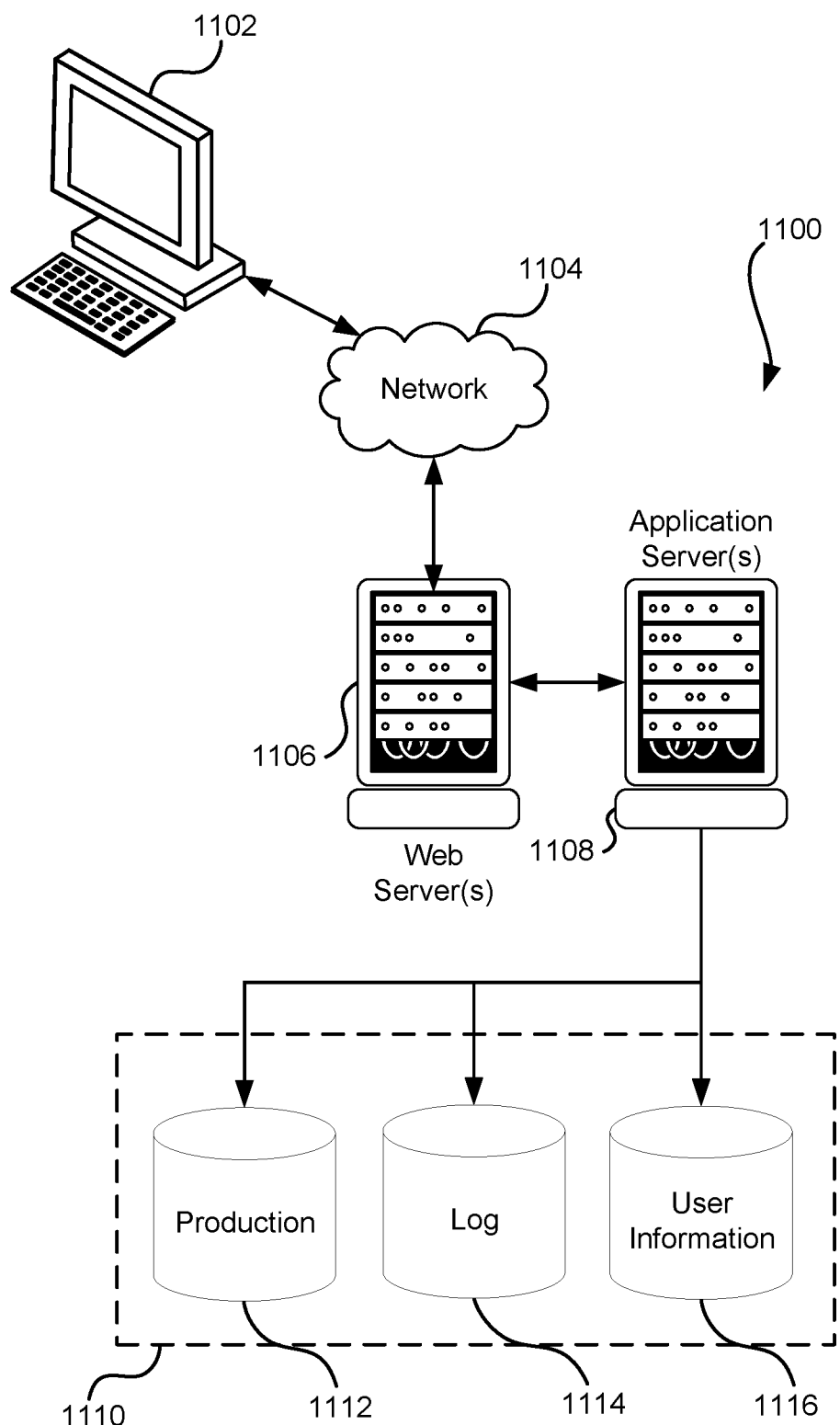
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

Embodiments of the disclosure can be described in view of the following clauses:

1. A computer-implemented method, comprising:
   receiving a request, at an instantiated virtual machine instance, to generate a report for a destination;
   receiving, based at least in part on credentials associated with the request, data from a storage location comprising one or more tokens, wherein the credentials associated with the request provides the virtual machine instance with information usable to access the data from the storage location;
   identifying, based at least in part on the request, a format of the report comprising the data;
   causing, by providing the one or more tokens to a service, the service to provide a subset of the data to be in clear text form;
   using the virtual machine instance to generate the report, according to the format of the report, to include the data and the subset of the data in clear text form;
   sending the report to the destination; and
   deleting the virtual machine instance in response to sending the report to the destination.

2. The computer-implemented method of clause 1, further comprising deleting the virtual machine instance in response to sending the report to the destination such that data included in the report is inaccessible outside of the virtual machine instance.

3. The computer-implemented method of clauses 1 or 2, wherein the format of the report is based at least in part on specifications associated with the destination, and wherein the format of the report includes information indicative on how to format at least one of: a subject header, body, file name, or content.

4. The computer-implemented method of any of clauses 1 to 3, wherein providing the one or more tokens to a service further comprises sending the one or more tokens to a tokenization service associated with the storage location, wherein access to the tokenization service is based at least in part on using the same credentials used to obtain access to the storage location.

5. The computer-implemented method of any of clauses 1 to 4, wherein the virtual machine instance uses only the data and the subset of the data in clear text form and no other data from the storage location to generate the report such that exposure is limited to only the data and the subset of the data in clear text form.

6. The computer-implemented method of any of clauses 1 to 5, further comprising determining whether an anomaly event has occurred during execution of the virtual machine instance and deleting the virtual machine instance in response to the determination that the anomaly event has occurred.

7. A system, comprising:
   at least one computing device configured to implement one or more services, wherein the one or more services:
   obtain a request to generate a report for a destination with content that satisfies a set of conditions associated with the destination;
   use credentials associated with the request to obtain data comprising one or more identifiers for sensitive data from a storage device;
   obtain the sensitive data as a result of transmitting the one or more identifiers to a service associated with the storage device;
   generate, based at least in part on the set of conditions, the report with content to include the data and sensitive data; and
   satisfy the request by transmitting the report to the destination.

8. The system of clause 8, wherein the data and the sensitive data included in the report are inaccessible outside of the system.

9. The system of any of clauses 7 or 8, wherein the set of conditions includes information indicating a type of content to be included in the report and format requirements for the report.

10. The system of any of clauses 7 to 9, wherein the service associated with the storage device is a tokenization service configured to replace one or more identifiers for sensitive data with the sensitive data, wherein the tokenization services includes a mapping of the one or more identifiers to storage locations of the sensitive data.

11. The system of any of clauses 7 to 10, wherein the request includes information indicative of a type of data to obtain from the storage device without exposing remaining data stored in the storage device.

12. The system of any of clauses 7 to 11, wherein the one or more services further sign the report with a private key associated with the system and encrypting the report with a public key associated with the destination.

13. The system of any of clauses 7 to 12, wherein the one or more services in response to obtaining the request to generate the report, generate a task identifier useable for other systems to query a transmission status of the report to the destination.

14. The system of any of clauses 7 to 13, wherein the sensitive data includes at least data associated with transaction records associated with a website.

15. A non-transitory computer-readable storage medium storing thereon executable instructions that, as a result of being executed by one or more processors of a computer system, cause the computer system to at least:
   obtain a request to generate a report for a destination with content that satisfies a set of conditions associated with the destination;
   use credentials associated with the request to obtain data comprising one or more identifiers for sensitive data from a storage device;
   obtain the sensitive data as a result of transmitting the one or more identifiers to a service associated with the storage device;
   generate, based at least in part on the set of conditions, the report with content to include the data and sensitive data; and satisfy the request by transmitting the report to the destination.

16. The non-transitory computer-readable storage medium of clause 15, wherein the computer system is a virtual machine instance operating in a virtualized environment.

17. The non-transitory computer-readable storage medium of any of clauses 15 or 16, wherein the data and the sensitive data included in the report are inaccessible outside of the virtual machine instance.

18. The non-transitory computer-readable storage medium of any of clauses 15 to 17, wherein the set of conditions include information indicating a type of content to be included in the report and format requirements for the report.

19. The non-transitory computer-readable storage medium of any of clauses 15 to 18, wherein the service associated with the storage device is a tokenization service configured to replace one or more identifiers for sensitive data with the sensitive data.

20. The non-transitory computer-readable storage medium of any of clauses 15 to 19, wherein the request includes information indicative of a type of data to obtain from the storage device without exposing remaining data stored in the storage device.

21. The non-transitory computer-readable storage medium of any of clauses 15 to 20, wherein in response to obtaining the request to generate the report, generate a task identifier useable for other systems to query a transmission status of the report to the destination.

22. The non-transitory computer-readable storage medium of any of clauses 15 to 21, wherein the instructions further comprise instructions that, as a result of being executed by the one or more processors, cause the computer system to encrypt the report, prior to transmission, using keys associated with the destination.

23. A computer-implemented method, comprising:
receiving a request to identify one or more accounts comprising sensitive data, wherein the one or more accounts are associated with a customer of a computing resource service provider;
selecting a virtual machine instance to obtain information from the one or more accounts;
identifying an abnormality with transactions associated with the one or more accounts;
providing a subset of the sensitive data, as a result of identifying the abnormality, to a service in exchange for the subset of the sensitive data in clear text form;
using the virtual machine instance to generate a report to allow for visual inspection by an entity, wherein the report includes information indicating the abnormality with the transactions, the sensitive data, and the subset of the sensitive data in clear text form; and
deleting the virtual machine instance in response to completing the visual inspection.

24. The computer-implemented method of clause 23, wherein the virtual machine instance is selected, by the entity, from a pool of virtual machine instances.

25. The computer-implemented method of any of clauses 23 or 24, wherein the virtual machine instance remains active for an amount of time that is proportional to a completion time of inspecting the report.

26. The computer-implemented method of any of clauses 23 to 25, wherein identifying an abnormality with transactions associated with the one or more accounts further comprises monitoring a website for transaction records associated with the website.

27. A system, comprising: at least one computing device configured to implement one or more services, wherein the one or more services:
instantiate a virtual machine instance to satisfy a request to query a report including suspicious activity associated with a destination;
use the virtual machine instance to identify transaction records for an account associated with a customer;
determine whether an activity in the transaction records satisfy a set of conditions associated with the destination;
obtain sensitive data associated with the activity in clear text form; and
generate the report to include the activity comprising the sensitive data in clear text form.

28. The system of clause 27, wherein the virtual machine instance is instantiated with infrastructure and services to satisfy the request to query the report.

29. The system of any of clauses 27 or 28, wherein the virtual machine instance monitors transaction records specific to the customer such that exposure is limited to the transaction records.

30. The system of any of clauses 27 to 29, wherein the at least one computing device configured to implement one or more services, further comprises: sending the report to the destination to after querying the report for suspicious activity; and deleting the virtual machine instance after sending the report to ensure sensitive data processed by the virtual machine instance to generate the report is deleted.

31. The system of any of clauses 27 to 30, wherein the at least one computing device configured to implement one or more services, further comprises: instantiating a second virtual machine instance to monitor a second set of transaction records for the account associated with the customer; determining whether an activity in the second set of transaction records satisfy the set of conditions associated with the destination; obtaining sensitive data associated with the activity in clear text form; and generating a second report to include the activity comprising the sensitive data in clear text form.

32. The system of any of clauses 27 to 31, wherein the at least one computing device configured to implement one or more services, further comprises: sending the second report to the destination; and deleting the second virtual machine instance after sending the report to ensure sensitive data processed by the second virtual machine instance to generate the second report is deleted.

33. The system of any of clauses 27 to 32, wherein virtual machine instance remains active proportional to the amount of time the report is generated.

34. The system of any of clauses 27 to 33, wherein the set of conditions include information indicating a type of suspicious activity that requires a report to be generated.

35. A non-transitory computer-readable storage medium storing thereon executable instructions that, as a result of being executed by one or more processors of a computer system, cause the computer system to at least:
instantiate a virtual machine instance to satisfy a request to allow an entity to inspect a report including suspicious activity;

use the virtual machine instance to identify transaction records for an account associated with a customer;

determine whether an activity in the transaction records satisfy a set of conditions;

obtain sensitive data associated with the activity in clear text form; and generate the report to include the activity comprising the sensitive data in clear text form.

36. The non-transitory computer-readable storage medium of clause 35, wherein the virtual machine instance is instantiated with infrastructure and services to satisfy the request.

37. The non-transitory computer-readable storage medium of any of clauses 35 or 36, wherein the virtual machine instance monitors transaction records specific to the customer such that exposure is limited to the transaction records.

38. The non-transitory computer-readable storage medium of any of clauses 35 to 37, wherein the instructions further comprise instructions that, as a result of being executed by the one or more processors, cause the computer system to: sending the report to a destination after querying the report including suspicious activity; and deleting the virtual machine instance after sending the report to ensure sensitive data processed by the virtual machine instance to generate the report is deleted.

39. The non-transitory computer-readable storage medium of any of clauses 35 to 38, wherein the instructions further comprise instructions that, as a result of being executed by the one or more processors, cause the computer system to: receive a task query request, at the virtual machine instance, on a status of sending the report; send a notification in response to the task query request; and delete the virtual machine instance after sending the notification that the report is sent.

40. The non-transitory computer-readable storage medium of any of clauses 35 to 39, wherein virtual machine instance remains active proportional to the amount of time the report is generated.

41. The non-transitory computer-readable storage medium of any of clauses 35 to 40, wherein the set of conditions include information indicating a type of suspicious activity that requires a report to be generated.

42. The non-transitory computer-readable storage medium of any of clauses 35 to 41, wherein the instructions further comprise instructions that, as a result of being executed by the one or more processors, cause the computer system to instantiate a second virtual machine instance to monitor a subset of the transaction records for the account associated with the customer to generate a second report while the first virtual machine instance monitors the account.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
receiving a request, at an instantiated virtual machine instance, to generate a report for a destination;
receiving, based at least in part on credentials associated with the request, data from a storage location comprising one or more tokens, wherein the credentials associated with the request provides the virtual machine instance with information usable to access the data from the storage location;
identifying, based at least in part on the request, a format of the report comprising the data;
causing, by providing the one or more tokens to a service, the service to provide a subset of the data to be in clear text form;
using the virtual machine instance to generate the report, according to the format of the report, to include the data and the subset of the data in clear text form;
sending the report to the destination; and
deleting the virtual machine instance in response to sending the report to the destination.

2. The computer-implemented method of claim 1, further comprising deleting the virtual machine instance in response to sending the report to the destination such that data included in the report is inaccessible outside of the virtual machine instance.

3. The computer-implemented method of claim 1, wherein the format of the report is based at least in part on specifications associated with the destination, and wherein the format of the report includes information indicative on how to format at least one of: a subject header, body, file name, or content.

4. The computer-implemented method of claim 1, wherein providing the one or more tokens to a service further comprises sending the one or more tokens to a tokenization service associated with the storage location, wherein access to the tokenization service is based at least in part on using the same credentials used to obtain access to the storage location.

5. The computer-implemented method of claim 1, wherein the virtual machine instance uses only the data and the subset of the data in clear text form and no other data from the storage location to generate the report such that exposure is limited to only the data and the subset of the data in clear text form.

6. The computer-implemented method of claim 1, further comprising determining whether an anomaly event has occurred during execution of the virtual machine instance and deleting the virtual machine instance in response to the determination that the anomaly event has occurred.

7. A system, comprising:
at least one computing device configured to implement one or more services, wherein the one or more services:

obtain a request to generate a report for a destination with content that satisfies a set of conditions associated with the destination;

use credentials associated with the request to obtain data comprising one or more identifiers for sensitive data from a storage device;

obtain the sensitive data as a result of transmitting the one or more identifiers to a service associated with the storage device;

generate, based at least in part on the set of conditions, the report with content to include the data and sensitive data; and satisfy the request by transmitting the report to the destination.

8. The system of claim 7, wherein the data and the sensitive data included in the report are inaccessible outside of the system.

9. The system of claim 7, wherein the set of conditions includes information indicating a type of content to be included in the report and format requirements for the report.

10. The system of claim 7, wherein the service associated with the storage device is a tokenization service configured to replace one or more identifiers for sensitive data with the sensitive data, wherein the tokenization services includes a mapping of the one or more identifiers to storage locations of the sensitive data.

11. The system of claim 7, wherein the request includes information indicative of a type of data to obtain from the storage device without exposing remaining data stored in the storage device.

12. The system of claim 7, wherein the one or more services further sign the report with a private key associated with the system and encrypting the report with a public key associated with the destination.

13. The system of claim 7, wherein the one or more services in response to obtaining the request to generate the report, generate a task identifier useable for other systems to query a transmission status of the report to the destination.

14. The system of claim 7, wherein the sensitive data includes at least data associated with transaction records associated with a website.

15. A non-transitory computer-readable storage medium storing thereon executable instructions that, as a result of being executed by one or more processors of a computer system, cause the computer system to at least:

obtain a request to generate a report for a destination with content that satisfies a set of conditions associated with the destination;

use credentials associated with the request to obtain data comprising one or more identifiers for sensitive data from a storage device;

obtain the sensitive data as a result of transmitting the one or more identifiers to a service associated with the storage device;

generate, based at least in part on the set of conditions, the report with content to include the data and sensitive data; and satisfy the request by transmitting the report to the destination.

16. The non-transitory computer-readable storage medium of claim 15, wherein the computer system is a virtual machine instance operating in a virtualized environment.

17. The non-transitory computer-readable storage medium of claim 16, wherein the data and the sensitive data included in the report are inaccessible outside of the virtual machine instance.

18. The non-transitory computer-readable storage medium of claim 15, wherein the set of conditions include information indicating a type of content to be included in the report and format requirements for the report.

19. The non-transitory computer-readable storage medium of claim 15, wherein the service associated with the storage device is a tokenization service configured to replace one or more identifiers for sensitive data with the sensitive data.

20. The non-transitory computer-readable storage medium of claim 15, wherein the request includes information indicative of a type of data to obtain from the storage device without exposing remaining data stored in the storage device.

21. The non-transitory computer-readable storage medium of claim 15, wherein in response to obtaining the request to generate the report, generate a task identifier useable for other systems to query a transmission status of the report to the destination.

22. The non-transitory computer-readable storage medium of claim 15, wherein the instructions further comprise instructions that, as a result of being executed by the one or more processors, cause the computer system to encrypt the report, prior to transmission, using keys associated with the destination.

* * * * *